United States Patent [19]

Skarstad et al.

[11] 4,393,125
[45] Jul. 12, 1983

[54] BATTERY CATHODES

[75] Inventors: Paul M. Skarstad, Wayzata; Arthur J. Coury, St. Paul; Darrel F. Untereker, Cedar, all of Minn.

[73] Assignee: Medtronic, Inc., Minneapolis, Minn.

[21] Appl. No.: 142,662

[22] Filed: Apr. 21, 1980

[51] Int. Cl.³ .......................................... H01M 10/40
[52] U.S. Cl. ................................... 429/105; 429/213; 252/182.1
[58] Field of Search .................. 429/105, 191, 213; 252/182.1, 500

[56] References Cited

U.S. PATENT DOCUMENTS

| 3,352,720 | 11/1967 | Wilson et al. | 136/137 |
| 3,660,163 | 5/1972 | Moser | 136/83 R |
| 3,660,164 | 5/1972 | Hermann et al. | 136/83 R |
| 3,674,564 | 7/1972 | Schneider et al. | 136/83 R |
| 4,148,976 | 4/1979 | Sekido | 429/213 |
| 4,157,433 | 6/1979 | Phillips | 429/213 |
| 4,210,706 | 7/1980 | Skarsted | 429/213 |

Primary Examiner—Donald L. Walton
Attorney, Agent, or Firm—Schroeder, Siegfried, Vidas & Arrett

[57] ABSTRACT

Battery cathodes of the iodine-complex type including one or more additives for improved iodine utilization.

1 Claim, 1 Drawing Figure

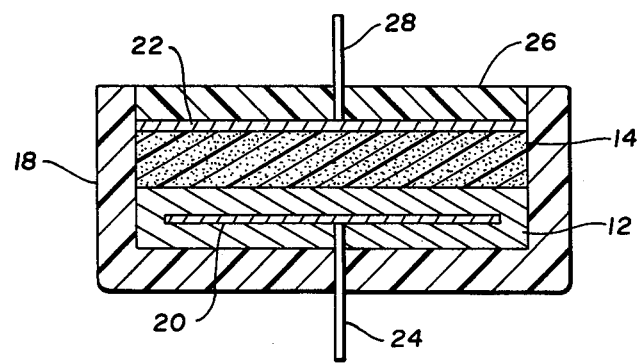

BATTERY CATHODES

DESCRIPTION

1. Background of Prior Art

This invention relates to batteries incorporating iodine-complex cathodes. Such cathodes have also been referred to as charge-transfer complex cathodes. Charge-transfer complexes are sometimes referred to as donor-acceptor compounds. The iodine in such a cathode reacts electrochemically with the battery anode, lithium for example or any other electropositive metal, to provide an electrical current. This reaction causes an iodide electrolyte to form in-situ between the anode and cathode. Such batteries may also contain preformed electrolytes of various composition. However, an iodide electrolyte formed substantially in-situ is preferred in most instances. The charge transfer donor is typically an organic compound. A charge-transfer donor typically used in iodine cathodes has been polyvinylpyridine, such as poly-2-vinylpyridine or poly-4-vinylpyridine. U.S. Pat. Nos. 3,660,163 to Moser, 3,660,164 to Hermann et al and 3,674,562 to Schneider et al describe examples of such batteries. These batteries are of the type which form an iodide electrolyte in-situ.

Examples of other charge-transfer organic donors which may be used in practicing the invention are described in the Wilson et al U.S. Pat. No. 3,352,720. Wilson et al broadly describes various amine-halogen complex compounds for battery cathodes, termed therein "depolarizers".

Additional iodine donors are disclosed in copending application Ser. No. 124,082, filed Feb. 25, 1980 and entitled "Cathode Materials For Electrochemical Cells". That application is assigned to the same assignee as is the present invention. Copending application Ser. No. 34,266, filed Apr. 30, 1979 now U.S. Pat. No. 4,210,706 and assigned to the same assignee as this invention, issued July 1, 1980 as U.s. Pat. No. 4,210,706, also discloses a variety of organic donors which may be used in this invention.

The descriptions contained in the various patents and in the patent applications referred to above are all incorporated herein by reference.

The preferred donors for use in the cathode materials of this invention are the various amine type donors including such amines as aniline and trimethylamine. More preferred donors are pyridine and pyridine derivatives including those such as the various ethylpyridines, methylpyridines, quinoline, the various methylquinolines and the like. Most preferred donors are vinylpyridine, vinylpyridine derivatives and polymers thereof including those such as 2-vinylpyridine, poly-2-vinylpyridine, poly-4-vinylpyridine, and the like.

In batteries of the type described above, it has become the practice to include additional amounts of free iodine i.e., excess iodine, which is not combined in complex form, as part of the cathode material in order to provide an iodine reservoir for the battery to draw on during discharge. The additional iodine increases the useful life of a battery. The cathode materials of this invention include excess iodine in a solid phase portion.

BRIEF SUMMARY OF THE INVENTION

It has been discovered that iodine-complex cathodes are limited in their percent iodine utilization due to the amount of iodine bound in the complex. This iodine is not electrochemically available for useful battery reaction. Consequently, it is desired in accordance with this invention to eliminate as much donor as possible consistent within desired conductance and viscosity levels of the cathode material. Viscosity is important because it should be maintained at a level which prevents any substantial segregation of the various cathode components. This will vary depending on the particular cathode combination and its intended use.

The invention is not, in its broad aspects, directed to any particular cell or battery structure, configuration or design, but rather to improved cathode materials as described herein for use in combination with any battery design configuration or structural arrangement. In physical arrangement, it is only required that an anode and a cathode, according to the invention, be placed in operative relationship with each other in the broadest sense. Generally, the improved cathode materials of the invention comprise an organic donor, iodine and an additional component or components selected from a group to be described hereinbelow. The cathode materials consist of liquid and solid portions. Preferably, the liquid portion is viscous i.e., not highly fluid. The solid portion will consist chiefly of iodine but may include other components.

Two-phase liquid/solid compositions represent a preferred form of the cathode materials of the invention. However, it is only necessary that the materials include a solid portion and a liquid portion, each of which may consist of one or more phases. In other words, although the preferred material of the invention takes the form of a two-phase liquid/solid composition, the solid phase in most cases consisting of solid iodine, the invention also includes within its scope compositions wherein the liquid and solid portions each may include more than one single liquid or solid phase, respectively.

The cathode materials of the invention exhibit improved utilization of the iodine contained therein as compared to similar iodine-donor complex cathodes without the additional component i.e., having donor substituted therefor, but of equal volume and containing the same relative amount of iodine.

As is known from the above cited patents and patent applications, iodine-complex cathodes are generally formed when iodine is combined with an organic donor compound. At ambient temperatures such complex cathodes may be solid in form depending on the particular components used. Pyridine and iodine form such a solid complex. However, many such cathodes may also be two-phase in form. For example, poly-2-vinylpyridine plus iodine in a ratio of one mole of 2-vinylpyridine units to one mole of $I_2$ forms a solid. In about a one-to-two or one-to-three mole ratio it forms a liquid and in a mole ratio higher than about one-to-three it forms a two-phase liquid/solid material. The latter cathode material i.e., material of a mole ratio greater than about one-to-three, has been referred to as containing "excess" iodine. It is in reality a two-phase cathode material comprised of liquid and solid phases. In most instances, from a visual standpoint, when a large amount of solid iodine is utilized relative to the volume of the liquid phase, the cathode consequently appears to be a solid. However, the solid iodine is wetted by the liquid phase even though it may not be readily discernable visually.

By substituting the additional components as set forth herein in place of some of the pyridine, solid complexes eg., pyridine and iodine, may be modified to form liquid/solid phases, providing a cathode material having improved iodine utilization thereof. Likewise, polyphase materials may, by use of the additional components, be modified to exhibit improved iodine utilization.

It is a purpose of this invention to provide cathode materials having smaller amounts of iodine donor compound than might ordinarily be utilized in them. In order to lessen the amount of iodine tied-up in complex formation and thereby increase the relative amount of iodine available for electrochemical reaction this invention effectively replaces some of the donor with an additional component or components to be described below. Consequently, the invention increases the iodine utilization capability of the cathode materials described above for any given volume thereof. The additional component binds the iodine less than the donor, if at all.

It is also a purpose of the invention to provide polyphase cathode materials in all instances, i.e., materials having solid and liquid portions, no matter what donor compound is used to form the iodine complex thereof.

The additional component may be any one or more of three types. The first type comprises any organic non-donor or substantially non-donor compound capable of copolymerizing with the organic donor of the complex. The term "non-donor" is meant to include weak donor compounds as well as non-donor compounds. In most instances, a copolymer will only be used when the organic donor comprises a polymer itself. The second type of additional component comprises any of five types of solvents capable of dissolving a solid iodine complex or of being miscible with the liquid portion of a complex, hereinafter termed an "iodine/donor solvent" or "solvent". Such solvents may also be used to decrease the viscosity of the liquid portion of a cathode material. The third type of additional component comprises thickening agents for use in the liquid phase of a cathode material to increase the viscosity thereof as desired. Any one or more of these components may be used in any given cathode material. A cathode material of the invention will always include a solid phase, preferably consisting essentially of iodine.

BRIEF DESCRIPTION OF THE DRAWING

The FIGURE comprises a schematic showing of a typical battery utilizing a cathode material of the invention.

DETAILED DESCRIPTION OF THE INVENTION

As already pointed out, the cathode materials of the invention may be formed with a wide variety of organic donor compounds. The invention will be specifically described in accordance with several preferred embodiments, including those which make use of polyvinylpyridine (PVP) donor compounds such as poly-2-vinylpyridine (P2VP) and poly-4-vinylpyridine (P4VP). These compounds form liquid complexes with iodine, as already noted, and, when used with excess iodine, form two-phase liquid/solid cathode materials. Depending upon the molecular weight of the polymer, the liquid phase will be more or less fluid. This is an important aspect of the operation of the cathode material.

The additional components of the invention described herein may be used to control the viscosity of the liquid phase, as already indicated. Consequently, one aspect of the invention deals broadly with various means in the form of additional component or components, as provided herein, for controlling the viscosity of the liquid phase. The additional component or components may comprise one or more of the following: a copolymer component, a solvent component to form a liquid phase or to decrease the viscosity of an already existing liquid phase or a thickener component to increase the viscosity of a liquid phase. The particular viscosity desired in any specific cathode material will depend on various factors, such as intended use, environment and the like.

The following Examples are illustrative of specific embodiments of the invention.

EXAMPLE I 2-vinylpyridine (2VP) is copolymerized with styrene, butadiene or acrylonitrile as an additional component according to the invention. In such a copolymer the 2-vinylpyridine portion of the polymer is in effect diluted due to the presence of the balance of the copolymer which is the additional component of the material. Such a copolymer may then be complexed by the addition of iodine thereto to form a two-phase cathode material of the invention. The relative amounts of 2-vinylpyridine and styrene, butadiene or acrylonitrile may vary over a wide range, consistent with the ultimate conductivity requirements of the cathode material.

EXAMPLE II 4-vinylpyridine (4VP) is copolymerized with styrene, acrylonitrile or butadiene and an iodine complex is formed, as above. The relative amounts will again be determined by the ultimate characteristics desired in the cathode material.

EXAMPLE III

A series of 2-vinylpyridine/styrene and 4-vinylpyridine/styrene copolymers was prepared by radical polymerization using azobisisobutyronitrile or benzoyl peroxide as initiator. The styrene content of the copolymer ranged from 15% to 50% by weight. Larger or smaller amounts of styrene may be used.

Cathode materials employing these copolymers and iodine were prepared and cells were constructed as described below in connection with Example IV. The cells were discharged and found operable. Initial voltages for several such cells are included in Table I.

TABLE I

| | Load Voltages | | |
| --- | --- | --- | --- |
| | | Load | |
| Cell | Open Circuit | 100 KΩ | 10 KΩ |
| 70% 2VP 30% Styrene | 2.807 | 2.800 | 2.751 |
| 70% 2VP 30% Styrene | 2.805 | 2.799 | 2.745 |
| 85% 2VP 15% Styrene | 2.805 | 2.796 | 2.720 |
| 85% 2VP 15% Styrene | 2.806 | 2.793 | 2.698 |
| 85% 4VP 15% Styrene | 2.828 | 2.779 | 2.635 |
| 85% 4VP 15% Styrene | 2.833 | 2.782 | 2.618 |

EXAMPLE IV

A cathode material was prepared by reacting iodine with a copolymer containing 70% 2-vinylpyridine and 30% styrene in a Teflon vessel at 130° C. for 19 hours. Initially, 20.00 g of $I_2$ were placed in the container with 2.00 g of copolymer. The total weight of the product was 21.57 g. Assuming that the 0.43 g lost during reaction was iodine, the final ratio of iodine to copolymer in the cathode mixture was 19.57 g $I_2$ to 2.00 g copolymer. The copolymer was obtained from Aldrich Chemical Company, Milwaukee, Wis.

A second cathode material, containing 20.00 g $I_2$ and 2.00 g poly-2-vinylpyridine (Ionac Chemical Company), was prepared under identical conditions. After reaction, 0.18 g had been lost. Assuming the loss all to be iodine, the weight ratio of iodine to polymer in the prepared cathode was 19.82 g $I_2$ to 2.00 g P2VP.

Both cathode materials were tar-like and highly viscous; the copolymer material was slightly harder than the pure P2VP material.

Two identical cathode-limited Galvanic cells were prepared of each cathode material in polypropylene cups with ID 2.54 cm. An anode of lithium 1 mm thick was pressed into the bottom of each cup. The cathode material (2.50 g) was spread uniformly over the anode and pressed lightly to assure good contact. A disk of Hastelloy C was used as the current collector. To close the cell, a slightly oversized polypropylene disk was pressed into the top of the cell body with a tab from the current collector hanging out.

The cells were discharged under constant resistive loads of 10 K$\Omega$ for about 20 weeks at 37° C. Periodically, the cells were relaxed at open-circuit for 24 hours and then discharged under a 400 K$\Omega$ load for 24 hours to approximate the current density required by cardiac pacemakers, a usual application for batteries of this type. The tests were continued until the voltage, after 24 hours under 400 K$\Omega$ load, fell below 2.0 V for each cell. Discharge curves for the two cells of each type followed each other closely.

Results of the discharge experiments are summarized in Table 2. The cells with copolymer cathodes ran at higher voltages throughout most of the discharge and delivered significantly more capacity than those with the pure P2VP-based cathodes.

The reason for the increased capacity is suggested by the data in Table 3, showing that the discharge proceeded to nearly the same ratio of iodine to pyridine in both cases.

TABLE 2

| | DISCHARGE PERFORMANCE | | | | |
|---|---|---|---|---|---|
| Cathode Additive | Time to EOL* (Weeks) | Delivered Capacity (Ah) | Cathode Stoichiometric Capacity | Cathode Utilization (%) | Remaining Stoichiometric (Ah) |
| poly(0.7 2-vinyl-pyridine/ 0.3 Styrene) | 18.5 | 0.3548 | 0.4790 | 76.15 | 0.1142 |
| poly(2-vinyl-pyridine) | 19.5 | 0.3226 | 0.4796 | 67.26 | 0.1570 |

L = end of life.

TABLE 3

| FINAL COMPOSITION OF CATHODES | | | |
|---|---|---|---|
| Cathode Composition | Undischarged $I_2$ (m moles)* | Total Pyridine (m moles) | EOL Ratio (Moles $I_2$) (Moles) Pyridine |
| poly(0.7 2-vinyl-pyridine/0.3 Styrene) | 2.131 | 1.550 | 1.375 |
| poly(2-vinyl-pyridine) | 2.929 | 2.182 | 1.342 |

*m mole = millimoles

Solid iodine cathode materials may be dissolved with substantially inert solvents. Iodine cathode materials having solid and liquid portions may include an inert solvent to modify the viscosity of the liquid portion. The use of solvents is described below in the following Examples.

The solvents may be of five types:
(1) polar halocarbons eg., chloroform and orthodichlorobenzene;
(2) ethers eg., diethylether, tetrahydrofuran (THF) and glyme (glycodimethylether);
(3) ketones eg., acetone;
(4) amides eg., dimethylformamide (DMF), and
(5) sulfones eg., sulfolane.

EXAMPLE V

Iodine cathodes containing very high molecular weight poly-2-vinylpyridine (P2VP) or poly-4-vinylpyridine (P4VP) may be diluted with solvents eg., tetrahydrofuran or orthodichlorobenzene to decrease the viscosity thereof and to improve the iodine utilization thereof.

Varying amounts of solvent may be used in the cathode material. The amounts may vary over a wide range depending on the characteristics desired in the cathode material.

EXAMPLE VI

A cathode material of the solvent type was prepared using tetrahydrofuran as a solvent. The mixture of P2VP was heated at about 125° C. for 24 hours following which the solvent was added. Cells (same structure as described in Example IV) of 100:1 weight ratio iodine:P2VP were dischargable to 91%–92% total $I_2$ utilization at 10 K$\Omega$ resistive loads at 37° C. End-of-life for these cells was defined as about 0 V. The amount of solvent needed to obtain this utilization was between 2% and 5% by weight. When less than 1% solvent by weight was added to the cathode, utilization obtained was about 80%. These materials were highly viscous.

The following Examples demonstrate the use of greater amounts of solvent.

EXAMPLES VII–XIII

Iodine and P2VP were reacted together in a ratio of 8 parts of iodine to 1 part of P2VP by weight in a sealed reaction vessel at 320° C. for 4 hours. The resulting solution mixture is a homogeneous solution which is very near to the saturation point in iodine.

This procedure is described more fully in U.S. Pat. No. 4,157,433, issued on June 5, 1979 and assigned to the same assignee as the present invention. The content of that patent is incorporated herein by reference.

This solution was used as a stock solution to prepare the samples listed in Table 4 below. The stock solution as initially prepared was highly fluid.

The samples listed in Table 4 were prepared as follows. In each case, the indicated amount of stock solution was placed in a test tube and the indicated amount of solvent additive was added. Conductivity was measured. Following this, additional iodine was added to saturate the solution and form a solid phase of excess iodine. Conductivity was again measured. Finally, vinylpyridine was added to increase the conductivity which was again measured.

It should be especially noted that even though the fraction of active vinylpyridine agent is considerably less in these solutions than would be the case if solvent were not present, the solutions nevertheless have sufficient conductivity to be used as the conductive liquid phase in an iodine cathode accompanied by improved iodine utilization.

Portions of the resultant sample solutions may be mixed with varying additional amounts of iodine to provide polyphase conductive cathode materials according to the invention.

The solvent type cathode materials are of interest because solvents may also be used with solid complexes eg., pyridine-iodine to form a liquid phase which is conductive when it is saturated with iodine.

In the examples included in the following Table 6, the components were mixed together at room temperature to form liquid solutions saturated with excess iodine, forming a precursor of a cathode material. The cathode material may be prepared from the precursor by adding additional iodine as by blending with finely divided iodine particles. The iodine may vary in amount over wide ranges.

TABLE 6

| Donor Example | Donor Amount (g) | Iodine Amount (g) | Solvent (THF) Amount (g) | Conductivity Liquid Phase (ohm cm)$^{-1}$ |
|---|---|---|---|---|
| XV pyridine | 4.67 | 38.52 | 21.31 | $3.22 \times 10^{-3}$ |
| XVI thiophene | 4.81 | 38.45 | 20.60 | $7.77 \times 10^{-3}$ |
| XVII phenothiazene | 11.46 | 38.76 | 20.75 | $2.41 \times 10^{-3}$ |

TABLE 4

| Solvent Additive Example | Stock solution (g) | Solvent (g) | Initial Conductivity $(\Omega cm)^{-1}$ | Additional Iodine (g) | Conductivity $(\Omega cm)^{-1}$ | Vinylpyridine Added (g) | Conductivity $(\Omega cm)^{-1}$ |
|---|---|---|---|---|---|---|---|
| VII Chloroform | 2.84 | 37.91 | $1.316 \times 10^{-6}$ | 5.39 | $4.016 \times 10^{-6}$ | 0.49 | $1.082 \times 10^{-5}$ |
| VIII Orthodichlorobenzene | 2.90 | 33.13 | $4.367 \times 10^{-5}$ | 7.02 | $6.978 \times 10^{-5}$ | 0.49 | $2.512 \times 10^{-4}$ |
| IX glyme | 2.65 | 25.22 | $3.367 \times 10^{-4}$ | 12.82 | $5.682 \times 10^{-4}$ | 0.49 | $2.070 \times 10^{-3}$ |
| X tetrahydrofuran | 2.77 | 24.04 | $4.808 \times 10^{-4}$ | 38.26* | | | |
| XI diethyl ether | 2.54 | 16.09 | $4.255 \times 10^{-6}$ | 4.37 | $3.922 \times 10^{-6}$ | 0.49 | $1.266 \times 10^{-5}$ |
| XII N,N—dimethyl-formamide (DMF) | 3.41 | 24.33 | $6.925 \times 10^{-3}$ | 31.93 | $6.485 \times 10^{-3}$ | 0.49 | $8.787 \times 10^{-3}$ |
| XIII Acetone | 3.28 | 20.70 | $1.658 \times 10^{-2}$ | 21.77 | $2.481 \times 10^{-2}$ | 0.49 | $2.73 \times 10^{-2}$ |

*With added iodine, this solution became viscous on standing overnight. Consequently, it is a particularly desirable candidate for cathode material use.

EXAMPLE XIV 4.5 g of P4VP was mixed with 20 ml of sulfolane (tetramethylene sulfone). The mixture was allowed to stand for 24 hours after which the liquid portion was decanted from a solid residue. The residue weighed 5.0 g. The composition of the residue was calculated to be at least 10% by weight sulfolane.

The residue was made into a cathode material by the addition of iodine and incorporated into test cells as described in connection with Example IV.

Initial voltages for one such cell is included in Table 5.

TABLE 5

| Load | LOAD VOLTAGES | | |
|---|---|---|---|
| | Open Circuit | 100 K$\Omega$ | 10 K$\Omega$ |
| Cell | 2.837 | 2.685 | 2.001 |

EXAMPLE XVIII

Highly fluid monomer donor such as 2-ethylpyridine (2EP) may be thickened by the use of substantially inert thickener materials according to this invention. Other such donors include 2-vinylpyridine (2VP), 4-ethylpyridine (4EP) and 4-vinylpyridine (4VP), for example. In high-ratio iodine-donor cells using such thickened monomeric donor materials, iodine utilizations obtained were on the order of at least about 80%. However, such donors, 2-ethylpyridine for example, can be thickened through the use of a variety of inert materials including fumed $SiO_2$ and finely divided $AlI_3$.

Other materials such as finely divided alumina, sheet silicates such as montmorillonite and finely ground lithium iodide may also be used to thicken the cathode materials of this invention, particularly the pyridine-based type. Other thickeners included polyethers eg., polyethyleneoxide, polyamides eg., poly-N-vinylpyrrolidone, hydrocarbon polymers eg., polystyrene, polybutene, poly-alpha-methylstyrene and styrene-butadiene rubbers and polysulfones. About 2% by weight was used although various amounts over wide ranges may be used.

EXAMPLE XIX

A 50:1 iodine:2EP cathode was thickened using 0.8% fumed $SiO_2$ by weight as an additive. The cathode material had a mean utilization of 85% for three cells. (Same structure as in Example IV). The cathode material was prepared by heating at about 125° C. for 24 hours. Discharge testing was done at 37° C. using a 10 KΩ load as in Example VI. The utilization was measured to about 0 v end-of-life voltage also as in Example VI.

EXAMPLE XX

A 50:1 iodine:2EP cathode was thickened using 2% by weight $AlI_3$. It had a mean utilization of 84% for three cells.

EXAMPLE XXI 7.43 g of the stock solution described in connection with Table 3 was mixed with 7.17 g of powdered Wyoming Betonite. The conductivity of the mixture was $7.87 \times 10^{-4}$ (ohm cm)$^{-1}$. 19.79 g of powdered iodine was added to the mixture. The resultant conductivity was $8.79 \times 10^{-4}$ (ohm cm)$^{-1}$. The material contained a weight ratio of iodine to vinylpyridine units of 32:1 and was considered a desirable cathode composition.

Samples of the stock solution described above in Examples VII–XIII were mixed with sufficient thickener additive to form a granular appearing solid. A liquid phase was present but not readily discernible visually. A sufficient amount of powdered iodine was added to each sample to provide a total amount in each of 10 moles $I_2$ for each mole of vinyl pyridine repeating unit in the stock solution. These cathode material samples were then tested for conductivity. The results are included in Table 7.

TABLE 7

| Example | Thickener Additive | Thickener Additive Amount (g) | Stock Solution Amount (g) | Iodine Amount Additional (g) | Conductivity (ohm-cm)$^{-1}$ |
|---|---|---|---|---|---|
| XXII | polysulfone* | 2.47 | 2.04 | 5.47 | $7.7 \times 10^{-4}$ |
| XXIII | polystyrene** | 5.05 | 2.60 | 6.97 | $5.0 \times 10^{-5}$ |
| XXIV | poly(alphamethylstyrene)*** | 2.74 | 1.93 | 5.18 | $6.9 \times 10^{-5}$ |
| XXV | poly(ethyleneoxide)**** | 3.03 | 2.22 | 5.95 | $1.2 \times 10^{-4}$ |

*Union Carbide Product P-1800NT-11
**Aldrich Chemical Co. - Catalog #18,242-7
***Amoco Product #18-290
****Union Carbide "Polyox"

Batteries, utilizing the cathode materials of the present invention, are provided by associating cathode material as described with an anode material and an electrolyte, if necessary. In accordance with the preferred form of the invention the electrolyte will form in-situ. For example, if a lithium anode is utilized and a poly-2-vinylpyridine-iodine complex is utilized as the cathode, a lithium iodide electrolyte will form in-situ between the anode and cathode as the cell discharges. Consequently, a preformed electrolyte is not necessary in such cases and in the preferred embodiments of the invention is not required.

When a solid iodide electrolyte is used, the anode will preferably be lithium or silver. However, when a liquid electrolyte is used, the anode may consist of any of the various electroposition metals such as those in Groups I, II and III of the Periodic Table, including zinc, cadmium, magnesium, aluminum, lithium, potassium, beryllium, strontium, calcium and sodium. Lithium is most preferred.

Various alloys containing at least one of the above metals may also be utilized.

If the battery is to include a preformed electrolyte as a means for providing ionic contact between the anode and cathode, the electrolyte may be a fluid and may be of the type described in the previously mentioned Wilson Pat. No. 3,352,720 or the equivalent.

The FIGURE comprises an electrochemical battery having a lithium anode 12 and a cathode 14 (with excess solid iodine) contacting anode 12. Cathode 14 will contain an additional component according to the invention as described above. The anode and cathode are disposed within an electrically insulated housing 18 and cover 26. The anode and cathode are respectively contacted by current collectors 20 and 22, which may for example be Hastelloy C or stainless steel. Other materials may be used as are known in this art such as zirconium for the anode collector and nickel or platinum for the cathode collector. Current collectors 20 and 22 preferably take the form of mesh or screen. Attached to current collectors 20 and 22, as by welding, are electrical leads 24 and 28, respectively. The electrical leads are sealed where they pass through housing 18 and cover 26 as by molding them into the housing and cover or by using an adhesive. Ultrasonic welding is also used to seal cover 26 to housing 18 and the unit may then be potted or placed in a hermetically sealed stainless steel container (not shown) or the like.

Housing 18 and cover 26 may be of an inert plastic material such as Halar, a trademark of the Allied Chemical Company. It is a proprietary chlorofluropolymer material. On the other hand, the housing and cover may be of any insulated material not substantially reactive with the cell components to be contained therein.

In practice, various cell designs and component materials may be used with the improved cathode materials of the invention, the cell of the FIGURE merely being illustrative of one type of cell and combination of materials. Materials for the cell components may be selected from any number of a wide variety of conventional materials known in the electrochemical art, particularly in the battery art.

As already stated, cells of the preferred embodiment described in accordance with the FIGURE, as previously stated, require no separate electrolyte component as initially constructed. Consequently, no electrolyte per se is shown in the FIGURE. However, following assembly, an electrolyte does form in-situ. The electrolyte builds up between the cathode and the anode, usually taking the form of a layer, initially, due to the direct reaction between the anode metal and the iodine of the cathode material. Subsequently, it continues as a result of electrochemical discharge. For example, in a cell having a lithium anode, lithium iodide electrolyte will form on the anode. Other anode metals will form corresponding iodides.

Having described the invention, the exclusive property rights claimed are defined as follows:

1. An iodine cathode for batteries, the cathode comprising a liquid/solid composition, the liquid portion being saturated with dissolved iodine and including an organic donor complexed with at least part of the iodine and further including an additional component of styrene copolymerized with a vinylpyridine donor, the solid portion of the cathode consisting essentially of iodine.

* * * * *

UNITED STATES PATENT AND TRADEMARK OFFICE
CERTIFICATE OF CORRECTION

PATENT NO. : 4,393,125
DATED : July 12, 1983
INVENTOR(S) : Paul M. Skarstad, et al It is certified that error appears in the above-identified patent and that said Letters Patent are hereby corrected as shown below:

Column 5, TABLE 2, line 66, "idine" should read --pyridine--.

Column 5, TABLE 2, line 68, before "= end of life." the abbreviation --*EOL-- should appear.

Signed and Sealed this

Thirteenth Day of December 1983

[SEAL]

Attest:

GERALD J. MOSSINGHOFF

Attesting Officer     Commissioner of Patents and Trademarks